Dec. 29, 1964  J. G. LANNING  3,163,256
MUFFLER WITH CERAMIC HONEYCOMB BAFFLE
Filed June 6, 1962  4 Sheets-Sheet 1
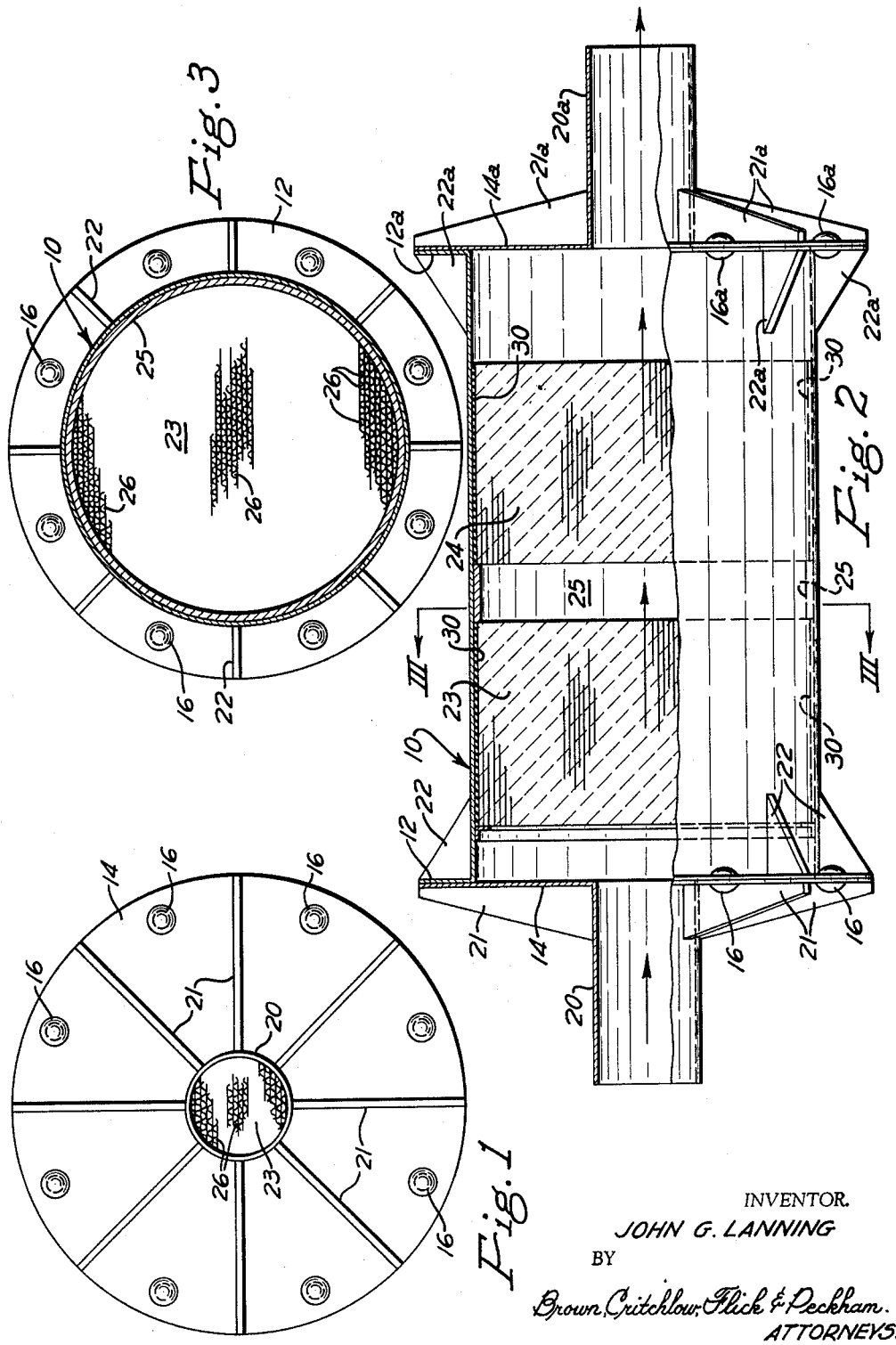
INVENTOR.
JOHN G. LANNING
BY
Brown, Critchlow, Flick & Peckham.
ATTORNEYS.

Dec. 29, 1964   J. G. LANNING   3,163,256
MUFFLER WITH CERAMIC HONEYCOMB BAFFLE
Filed June 6, 1962   4 Sheets-Sheet 2
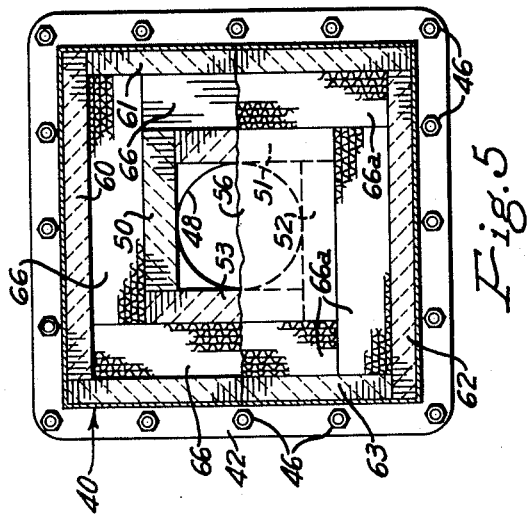
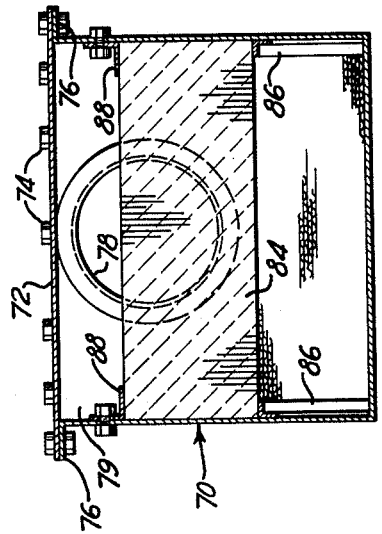
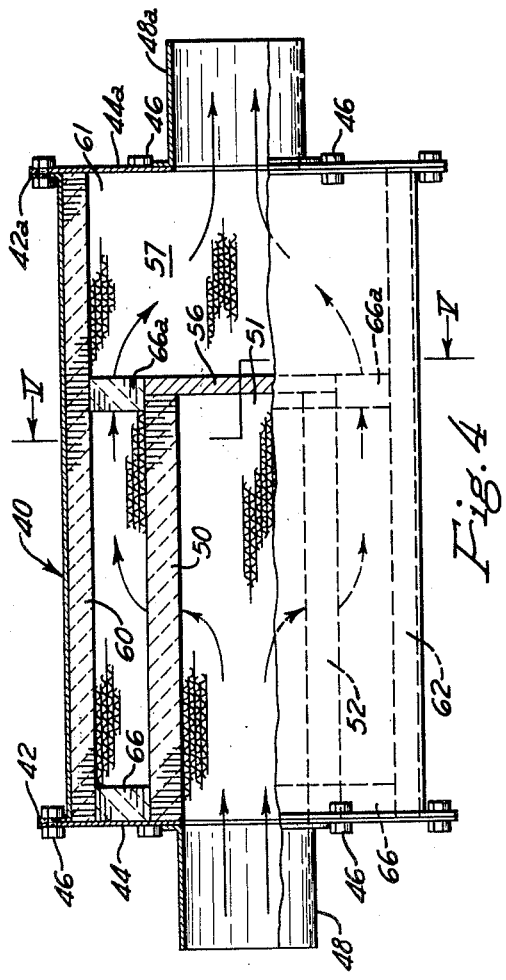
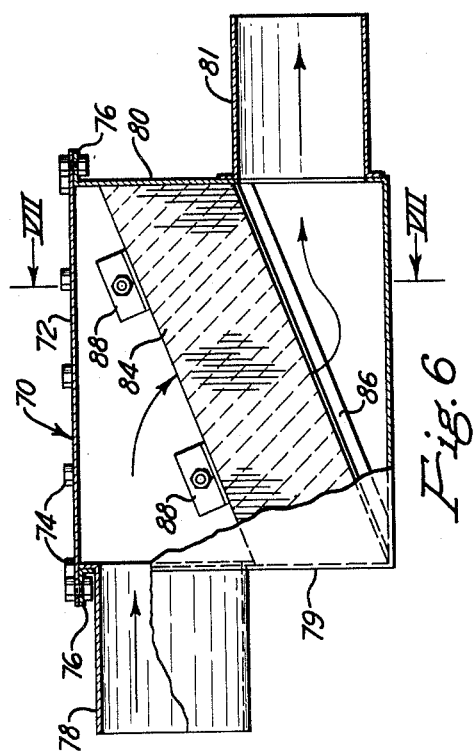
INVENTOR.
JOHN G. LANNING
BY
Brown, Critchlow, Flick & Peckham.
ATTORNEYS.

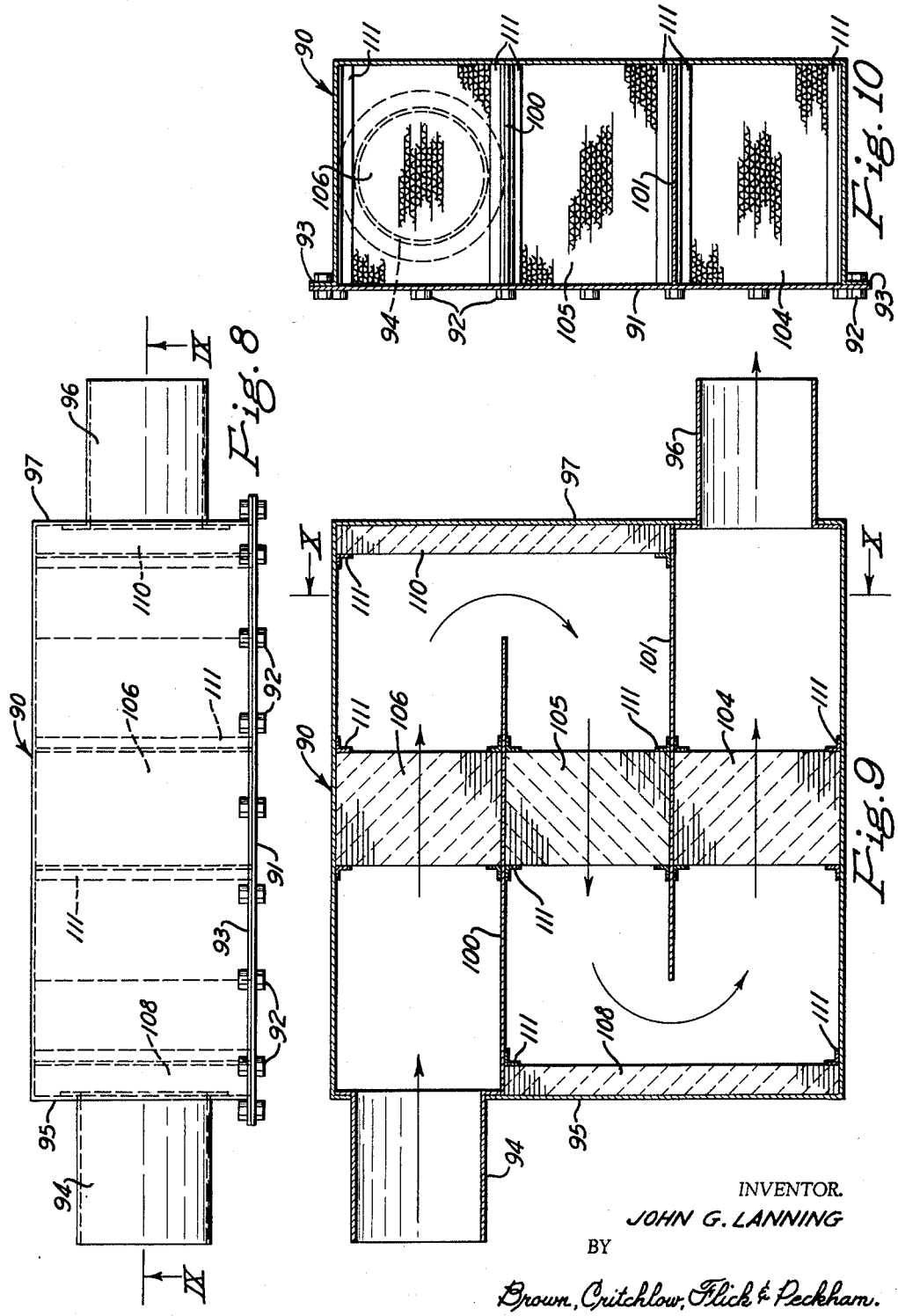

Dec. 29, 1964   J. G. LANNING   3,163,256
MUFFLER WITH CERAMIC HONEYCOMB BAFFLE
Filed June 6, 1962   4 Sheets-Sheet 4
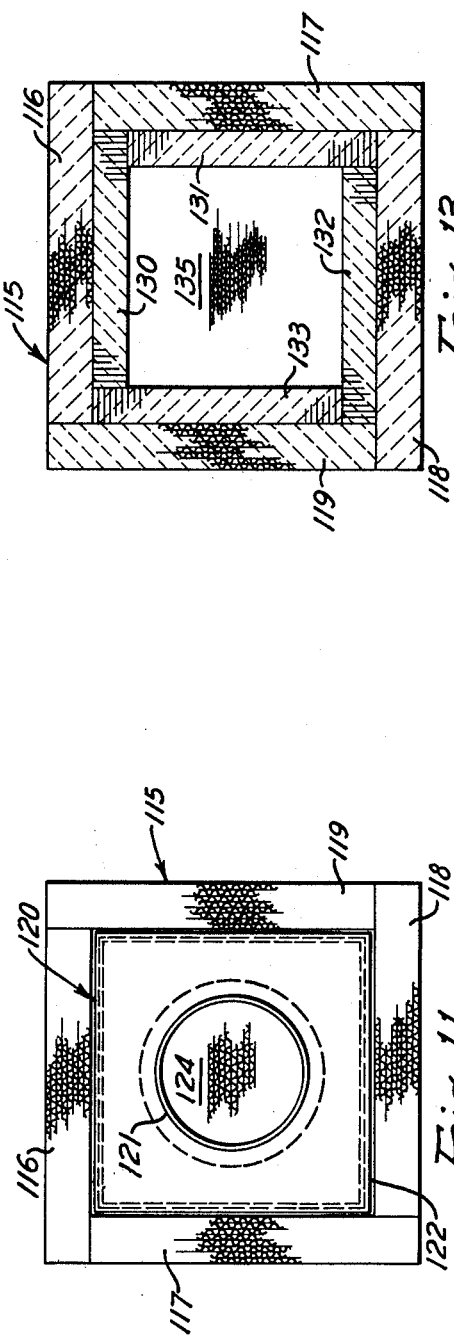
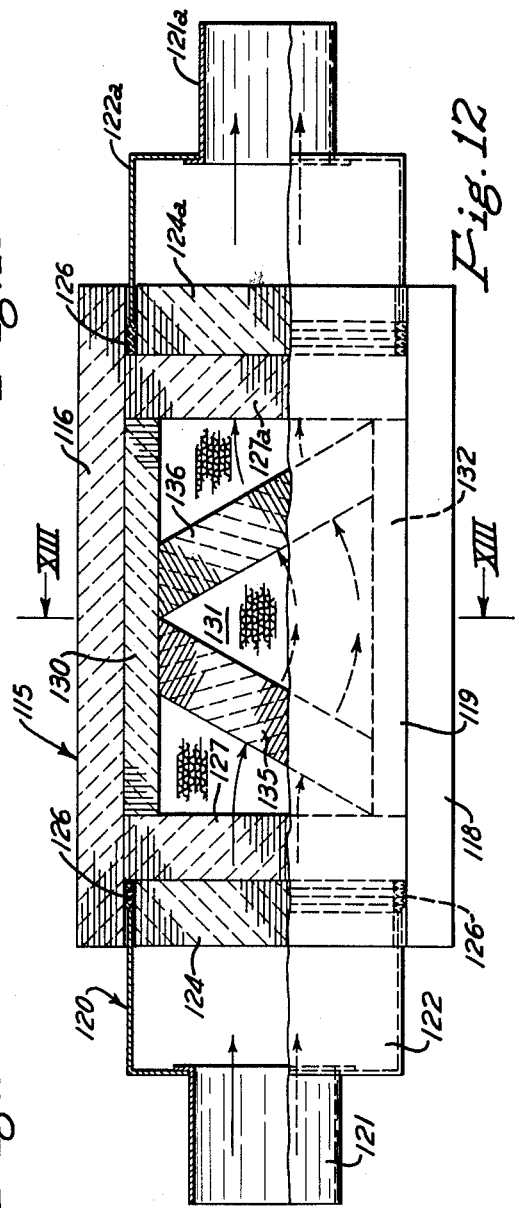
INVENTOR.
JOHN G. LANNING
BY
Brown, Critchlow, Flick & Peckham.
ATTORNEYS.

3,163,256
MUFFLER WITH CERAMIC HONEYCOMB BAFFLE
John G. Lanning, Corning, N.Y., assignor to Corning Glass Works, Corning, N.Y., a corporation of New York
Filed June 6, 1962, Ser. No. 200,472
7 Claims. (Cl. 181—56)

This invention relates to the deadening of sound and in particular comprises novel structure for that purpose.

Sound attenuation or deadening of the exhaust gases of internal combustion engines is a well developed, well-known art. Commonly structures for this purpose include baffles that serve a sound deadening function. Resistive type devices made of such materials as refractory fibers, ruptured cell foamed glass and the like and in which the sound deadening is brought about by surfaces largely parallel to gas flow have also been proposed for this purpose. However, as far as I am aware, no significant success has been had with resistive type muffling devices. The difficulties that have been encountered include physical and chemical destruction of the resistive means as well as low efficiency because the proposed structures develop very large back pressures.

Large back pressures severely cut down the engine volumetric efficiency. Thus, the pistons cannot expel all the exhaust gases from the cylinders due to the opposing force of the back pressure, thereby leaving some exhaust gases to mix in the chamber with the intake fuel. This results in dilution of the fuel mixture.

It is, therefore, the primary object of the present invention to provide novel resistive type mufflers particularly useful in the exhaust system of an internal combustion engine, that are easily prepared from inexpensive, readily available materials, that are strong and capable of withstanding high temperatures under chemically corrosive conditions without deteriorating mechanically or chemically, and that effectively deaden the sound of exhaust gases.

This and other objects are attained in accordance with my discoveries by providing a muffler comprising a casing member having inlet and outlet ports and a resistive member comprising at least one sintered thin walled ceramic honeycomb structure having a plurality of unobstructed gas passages extending between substantially opposed surfaces, the honeycomb structure having specific characteristics identified hereinafter and being aligned relative to the casing and conduits so that gases flow through it. In this general manner, there is provided a highly efficient sound deadening structure that is particularly advantageous in that its essential element is mechanically strong and is chemically resistant to highly corrosive conditions, and can withstand high temperatures and repetitive temperature changes without being adversely affected.

The ceramic honeycombs that serve as the resistive elements in mufflers in accordance with the principles of this invention have certain physical characteristics that are of a critical nature in order to provide the high strength, the temperature resistance and effective sound deadening. The honeycomb is a thin walled ceramic structure having a plurality of unobstructed gas passages, with the gas passages being defined and separated from one another by the thin ceramic walls. The gas passages are uniformly distributed or purposely made irregular throughout the structure. Their maximum cross-sectional area does not exceed about 0.010 square inch, and preferably is within the range of about 0.0002 to 0.002 square inch. The number of channels and the wall thickness are chosen so that there is at least 50 percent of free space, and preferably 70 to 85 percent, in the plane through the honeycomb perpendicular to the axes of the gas passages. One of the outstanding characteristics of mufflers in accordance with this invention is the negligible back pressure that the resistive element develops and the high free area largely contributes that characteristic. By way of example, a pressure drop of approximately two inches of water occurs through a one inch thick honeycomb having triangular gas passages with 0.006 inch walls and a 70 percent open area with an axial flow of room temperature air of 25 pounds per second per square inch $\times 10^{-3}$. The thin walls in the honeycombs generally are within the range of about 0.004 to 0.010 inch thick, but can be as thick as 0.015 inch or even somewhat thinner than 0.004 inch. The total length of the gas passages needed, in conjunction with the foregoing limitations, to provide effective sound attenuation varies depending upon the operating conditions and the like. Structures have been tested with one inch to 7 inch lengths with good efficiency. Even shorter or longer total length can be used. The required gas passage length can be achieved with a single honeycomb or can be supplied by a plurality of honeycombs that in the aggregate provide the requisite length. Where a plurality of honeycombs are used, they can be spaced or placed in an abutting relationship as desired.

The reasons why a ceramic honeycomb as indicated successfully deadens sound are not fully understood. However, in addition to the physical characteristics as just indicated, doubtless the ceramic nature of the structure and the porosity of the thin walls, which has been measured at 25 to 45 percent and has been calculated as about 0.23 ml. $H_2O$ per gram of ceramic, are significant contributing factors.

Ceramic honeycomb bodies that serve as the resistive element in structures of the present invention and conform to the limitations stated can be prepared by several processes. For example, a pulverized ceramic material can be admixed with a suitable binder and then extruded to ribbon form. The ribbon can be further shaped, if desired, and assembled either by itself or with other ribbons of this material to the desired honeycomb shape. The assembly is then sintered to a unitary structure. Preferably, however, the ceramic honeycomb body is prepared by coating a suitable carrier with a mixture of pulverized ceramic and a binder, crimping the resulting coated carrier and then assembling it to the desired shape alone or with another coated carrier that need not be crimped. The assembled body is then heated to a temperature sufficient to sinter it to a unitary structure as more fully detailed hereinafter. This latter procedure is generally the process set forth in Patent No. 3,112,184, assigned to the owner of the present application, to which reference can be made.

The purpose of the binder is to bond the unfired ceramic material to the carrier, to impart green strength to the coated carrier, and to retain the formed unfired article in the desired shape after forming and prior to sintering. Organic binders, and especially those that are heat curable, or thermosetting, are preferred as they are removed by decomposition, or volatilization or both when the article is fired. Among the many materials having the requisite, well-known characteristics of binders that can be used in the process are such natural materials as gum arabic, colophony, and shellac, and such synthetic organic resins as acrylate resins, methacrylate resins, alkyd resins, cellulose derivatives, coumarone-indene resins, phenolic resins, polyamides, furan resins, polyisobutylene, isocyanate resins, polyesters, resorcinol resins, styrene resins, terpene resins, urea resins, vinyl resins, epoxy resins, chlorinated paraffins, and melamine resins.

The purpose of the carrier is to provide support for the unfired coating to allow it to be formed to the desired shape prior to sintering the ceramic coating. Carriers suitably include those of such inorganic materials as aluminum foil, tin foil, aluminum silicate paper, copper screening, and asbestos cloth, and such organic materials as cellulose acetate paper, onion skin paper, tea bag paper, nylon cloth, rayon cloth, and polyethylene film. The organic film materials are preferred, for they substantially decompose upon firing the formed article.

Typical of the sinterable ceramic material suitable for preparing honeycombs of the present invention are such glasses as borosilicates, soda-lime-silicates, alumino-silicates, alkaline earth silicates, and the like. Refractory compositions that can be used include sillimanite, magnesium silicates, magnesia, zircon, zirconia, petalite, spodumene, cordierite, corundum, and the like. Glass-ceramics, that is crystalline materials made from glass (e.g. those disclosed in United States Patent No. 2,920,971 to Stookey) are also suitable. In addition, any combination of one or more glasses, refractory compositions or glass ceramics can also be used. A typical refractory composition that is used for making articles requiring low thermal expansion and high thermal shock resistance consists of 75 parts by weight of petalite and 25 parts by weight of a glass-ceramic having the following approximate composition by oxide analysis in weight percent: 70 percent $SiO_2$, 18 percent $Al_2O_3$, 5 percent $TiO_2$, 3 percent $Li_2O$, 3 percent $MgO$ and 1 percent $ZnO$. As noted in the Hollenbach application, the successful preparation of honeycombs is not dependent upon the sinterable ceramic material selected; the actual material used will be that found to be most suitable, considering its properties, for the conditions it will encounter in use.

In forming these honeycombs, the binder and sinterable ceramic material are applied to the carrier in any manner desired. For example, spraying, dipping or brushing a suspension of the ceramic in the binder on to the carrier can be practiced, or those materials can be applied separately or consecutively by such procedures. Thereafter, the coated carrier is shaped as by crimping or multiple-folding, hereinafter called corrugating.

Honeycombs are fabricated from the coated carriers in a variety of ways. These structures can be fabricated by multiple layers of films corrugated with the same pattern, with alternate layers laterally disposed a distance equal to half of the width of individual pattern so that layers do not nest into each other. Or the honeycomb structure can be formed from multiple layers of films corrugated with different patterns, or by using alternate layers of flat sheets between corrugated layers.

The firing of the green structure or matrix is accomplished in the normal manner by placing the article in a furnace and heating it at a rate slow enough to prevent breakage due to thermal shock to a temperature high enough to cause the ceramic particles to sinter. While the firing schedule, including heating rates and sintering temperatures, will vary depending upon the ceramic materials utilized, the size and shape of the article formed, and the atmosphere used, the details of such schedules are not critical and suitable conditions are readily determinable by one skilled in the art of firing ceramic articles.

Several specific embodiments of the invention will be described in conjunction with the attached drawings in which:

FIG. 1 is an inlet end view of a first embodiment of a muffler in accordance with the invention;

FIG. 2 is a side elevation, with parts broken away for clarity, of the muffler of FIG. 1;

FIG. 3 is a view along line III—III of FIG. 2;

FIG. 4 is a side view with parts broken away of a second embodiment of a muffler construction in accordance with this invention;

FIG. 5 is a view of the muffler of FIG. 4 taken along line V—V;

FIG. 6 shows a third muffler embodiment of the invention, in side elevation with parts broken away;

FIG. 7 is a view taken along line VII—VII of FIG. 6;

FIG. 8 is a side view in elevation of a fourth embodiment of the invention;

FIG. 9 is a view taken along line IX—IX of FIG. 8;

FIG. 10 is a view taken along line X—X of FIG. 9;

FIG. 11 is an end view of another muffler of the invention;

FIG. 12 is a side view in elevation, with parts broken away, of the muffler of FIG. 11; and FIG. 13 is a view taken along line XIII—XIII of FIG. 12.

Referring first to FIGS. 1, 2 and 3 of the drawings, the muffler includes a body or casing member 10. The shape of the casing member shown is cylindrical; it will be understood, however, that the shape is a design consideration and can be varied. About the ends of the casing 10 are annular flanges 12 and 12a. An inlet header 14 is joined to annular ring 12 by a suitable number of rivets 16 around its circumference. The header 14 contains a centrally located inlet conduit 20 which may be rigidly attached to the header by a plurality of gusset members 21. Other gusset members 22 support and align inlet annular flange 12 with respect to the casing member 10.

The outlet end of the muffler is similarly constructed and is enclosed by a header member 14a having a plurality of gusset members 21a on its surface and which serve to support the outlet conduit 20a. The outlet header is joined to the annular ring 12a, strengthened by gussets 22a, on the outlet end of the casing by rivets 16a.

Within the casing member 10 are thin walled ceramic honeycomb structures 23 and 24 longitudinally spaced by a spacer ring 25. The ceramic honeycomb structures are cylindrical to be easily received in casing 10 and have opposed parallel surfaces which in turn are parallel to the end walls. Each honeycomb has a plurality of unobstructed gas paths 26 extending between its parallel surfaces. Between the peripheral surface of each honeycomb and the inside surface of casing member 10 is an insulation layer 30, that may be fibrous alumina or analogous fiber refractory material that serves a shock absorbing function.

In operation with a muffler as shown in FIGS. 1, 2, and 3, the exhaust manifold of an internal combustion engine (not shown) is attached to the inlet conduit 20 and the outlet conduit 20a is exposed to the atmosphere, through a length of pipe if desired. Gases from the exhaust manifold pass into the inlet conduit and then through the gas passages 26 in both honeycomb structures 22 and 24 where the sound is deadened. Then the gases issuing from the outlet side of the honeycomb 24 pass outwardly through outlet conduit 20a.

In the muffler embodiment shown in FIGS. 4 and 5, a casing member 40 that is generally rectangular in longitudinal, horizontal and vertical cross-sections is provided having outwardly extending flanges 42 and 42a at each of its ends. The ends of the muffler are closed with header members 44 and 44a, each being joined to the appropriate flange by a series of nut and bolt units 46. An inlet conduit 48 that is welded or otherwise joined to the inlet header 44 serves to admit exhaust gases and an outlet conduit 48a at the outlet header 44a serves to permit exhausting gases to escape from the muffler.

The path of gases that have entered through inlet conduit 48 is first bounded by four rectangular honeycombs 50, 51, 52 and 53 (see FIG. 5) each having its gas passages generally perpendicular to the side, top or bottom wall that it is most near, and a solid wall 56 opposite the inlet conduit 48. The chamber thereby defined is sufficiently large to accommodate the opening of the inlet conduit. The solid wall 56 is located at a distance from the outlet header 44a so that an enlarged chamber 57 exists between those members. On the inside surfaces of the side, top and bottom walls of the casing member 40 are other honeycombs 60, 61, 62 and 63 each having its gas passage perpendicular to the plane of the wall it is against. The central honeycomb members 50, 51, 52 and 53 along with the solid end wall 56 are supported within the body and spaced from honeycombs 60, 61, 62 and 63 by sections of honeycombs indicated generally by the numerals 66 and 66a. Honeycombs 66 are located against the inside surface of the inlet header 44 while honeycombs 66a are between the solid wall 56 and the honeycombs 60, 61, 62 and 63. Honeycombs 66 and 66a have their gas passages perpendicular to the inlet and outlet headers 44 and 44a.

In operation with this muffler, exhaust gases from an internal combustion engine enter through the inlet conduit 48. Their linear flow is interrupted by the solid wall 56 and accordingly the gases pass radially of the axis of the inlet conduit through honeycombs 50, 51, 52 and 53. From there, they pass through the honeycomb sections 66a and emerge into the enlarged chamber 57 on the downstream side of the wall 56 and thereafter pass out through the outlet conduit 48a As will be apparent, gases issuing from honeycombs 50, 51, 52 and 53 can enter the gas passages in the honeycombs 60, 61, 62 and 63 along the inside surface of the casing member 40 as well as into the gas passages of honeycomb sections 66 that lie against the inside surface of inlet header 44. Since these gas passages are closed by the casing 40 and the header member 44, it is apparent that the gases are reflected back to the general stream. However, this excursion, during which gas is subjected to the resistive forces provided by the walls of each gas passage as well as the influence brought about by being repelled by the external walls of the device and the mixing that occurs in view of this change of direction of gas flow, also serves to deaden the sound.

Another muffler embodiment of the invention is shown in FIGS. 6 and 7. The rectangular casing member 70 has a top closure member 72 attached by nut and bolt units 74, or other means, to a flange 76 around its side and end walls. An inlet condit 78 is joined to the upstream or inlet end wall 79 of the casing 70 by welding or other means, and through which gases enter the muffler. The downstream or outlet end wall 80 has an outlet conduit 81 attached to it in similar fashion. As is evident in FIG. 6, conduits 78 and 80 are displaced with respect to one another and with respect to the central horizontal plane of the casing member 70 for reasons that will be made evident hereinafter.

Disposed generally diagonally, as viewed from the side, within the casing member 70 is a honeycomb 84 having its gas passages extending generally perpendicular to the top wall 72 of casing member 70. The honeycomb is supported in the embodiment shown by rails or angle members 86 along its lower edge which are secured to the side walls by spot welds or other means. Clips 88 that are bolted to the side walls rest on the upper surface of the honeycomb and serve to keep it from moving. The size and location of the inlet conduit 78 are chosen so that all gases entering the muffler will pass into honeycomb 84 through one of its surfaces, while the outlet conduit 81 size and location are to insure that gases emerging from the lower surface of the honeycomb can pass out the muffler.

It is apparent from the description of the muffler of FIGS. 6 and 7 that it provides a series of gas flow paths producing varying velocity such that pressure pulses flowing through the unit become out of phase with one another and thus contributes to sound deadening along with the resistive effect of the honeycomb gas passages.

In the muffler embodiment shown in FIGS. 8, 9 and 10, a reversed S shape flow path is defined. A tank-shaped casing member 90 serves to house the resistive members. Its top wall 91 (shown as the bottom wall in FIG. 8 for convenience) is removably attached to the tank by nut and bolt units 92 through a flange 93 provided for that purpose. An inlet conduit 94 welded or otherwise attached to one end wall 95 and an outlet conduit 96 similarly attached to the outlet end wall 97 provide for the entry and exit of exhaust gases. As may be observed in FIG. 9, the inlet and outlet conduits are laterally displaced with respect to one another.

Internally, the tank or casing member 90 contains two baffle members 100 and 101 extending between the top and bottom walls. A first of these baffle members 100 extends from the inlet end wall 95 just to the side of the inlet conduit 94 towards, but not to, the outlet end wall 97. The other baffle member 101 extends from the outlet end wall 97 just to the side of the outlet conduit 96 toward, but not touching, the inlet end wall 95. Three generally rectangular honeycombs 104, 105 and 106 are spaced within the casing. The first 104 extends between one side wall and the second baffle member 101. The second honeycomb 105 extends between the two baffles 100 and 101. And the third honeycomb 106 extends between the first baffle member 100 and the other side of the casing 90. Along the inside surface of inlet end wall 95 is a fourth honeycomb 108 of a size and location to oppose honeycombs 104 and 105. A similar honeycomb 110 is along the inside surface of the outlet end wall 97 opposite honeycombs 105 and 106. These five honeycombs can be fixed with respect to the members touched by short rail or angle section 111 welded to the various members in conventional manner.

Honeycombs 104, 105 and 106 suitably are centrally aligned and are spaced a distance away from the free ends of the baffle members 100 and 101. Consequently, flow through the muffler structure is through the inlet conduit 94 then through honeycomb 106, out of that honeycomb and around the free end of the first baffle member 100 and into the middle honeycomb 105. Gases from the middle honeycomb flow around the free end of the second baffle member 101 and into the third honeycomb 104 from which they emerge and pass through the outlet conduit 86. As in the other embodiments, gases can also enter the passages in honeycombs 108 and 110. Such gas is repelled back to the main flow path by the end walls 95 and 97.

A fifth embodiment of a muffler of the invention is shown in FIGS. 11, 12 and 13. The muffler includes a casing member indicated generally as 115 that is rectangular in longitudinal and vertical section. In the embodiment shown, the casing 115 is composed of four honeycomb structures 116, 117, 118 and 119 cemented to one another by, for example, a cement that can be a foaming cement such as is disclosed in the copending application of Stong, Serial No. 164,993, filed January 8, 1962, assigned to the owner of the present application. If desired, these honeycombs could be held together by metal straps, bands or the like. The gas passages in those honeycombs are located so that no fluid communication is permitted through them to the inside of the muffler. This casing thereby provides a thermal insulation covering for the muffler unit. It will be appreciated that a suitable ceramic casing could as well be formed by slip casting or extruding a particulate ceramic mass into an appropriately shaped solid body. Such a body could also be made of foamed glass or foamed crystalline ceramic.

The inlet end of the casing member 115 is closed by a header 120 snugly received by the casing member 115. The inlet header 120 is composed of a cylindrical inlet conduit 121 and a casing 122 of vertical section smaller than the casing 115. The outlet end of the casing member 115 is similarly constructed of a header composed of an outlet conduit 121a and a casing 122a received within the casing 115.

The walls of casing 122 and 122a extend to within the main casing 115. At their inner extremities each of casings 122 and 122a supports a honeycomb member 124 and 124a, respectively, arranged with the gas passages parallel to the axes of the inlet and outlet conduits. To aid in retaining the honeycombs 124 and 124a, the walls of casings 122 and 122a can be corrugated as at 126. Adjacent each of those honeycombs are additional honeycomb members 127 and 127a that also have the gas passages generally parallel to the axes of the inlet and outlet conduits.

The space between honeycombs 127 and 127a is lined with four honeycomb members 130, 131, 132 and 133 having their gas passages perpendicular to those in honeycombs 127 and 127a. Within the space bounded by honeycombs 130 to 133 are two more honeycombs 135 and 136 arranged to an inverted V, as viewed from the side. These honeycomb members extend fully between side wall honeycombs 131 and 133 as well as between the top and bottom honeycomb members 130 and 132. Their gas passages are at a small angle from parallel to the axes of the inlet and outlet conduits.

In using this muffler, gases entering through inlet conduit 121 enter the header casing member 122 and then pass through honeycombs 124 and 127 and emerge into the open space upstream of honeycomb 135. Then the gases pass through honeycomb 135 and into honeycomb 136. After emerging from honeycomb 136, they pass through honeycombs 127a and 124a into outlet header casing chamber 122a and then out of the outlet conduit 121a. It will thus be apparent that the overall resistive flow path defined by the muffler construction in accordance with FIGS. 11, 12 and 13 is composed of the six individual honeycombs 124, 127, 135, 136, 127a and 124a. The pair of terminal honeycombs at each end of the muffler provides straight through flow paths and the essential influence of those honeycombs is of a resistive character. The internal honeycomb members 135 and 136 cause a double change in the direction of flow of the gas with respect to the axes of the inlet and outlet conduits and thus exert that influence as well as a resistive influence on the gases. In addition to the six honeycombs through which the gases must flow, gas can also enter the side wall honeycombs 130 to 133 and penetrate to the inside surface of the honeycombs defining casing member 115. They will then be deflected back into the central chamber. This, of course, further deadens sound for reasons indicated hereinbefore.

Structures in accordance with this invention have been made and tested under severe circumstances. A muffler according to the structure shown in FIGS. 1, 2 and 3 and having as its essential resistive element two spaced-apart honeycombs each three inches long made of the aforementioned petalite-glass-ceramic mixture was used. The assembled muffler was substituted for the commercial muffler on a 1953 Willys CJ3B Jeep. The engine of this Jeep had a displacement of 155 cu. in. and was operated at levels up to 4000 r.p.m. for ten months over a period that included an entire severe winter. Sound quality was found comparable throughout the ten month period to that achieved by the commercial unit. It may be noted that the commercial unit was in good muffling condition at the time it was tested. After this ten month test, examination of the resistive muffler showed no observable mechanical or chemical deterioration. Furthermore, except for a very small annular zone adjacent the periphery of the honeycomb, no build-up of exhaust products was found.

Another severe test to which structures of this invention have been subjected is as follows. The passages of a block of a honeycomb structure having characteristics suited to the invention were filled with water. Then the water was caused to freeze completely. After melting and draining the water, no mechanical disruption or fracture was found in the honeycomb. This is particularly significant in view of the condensation and freezing of water vapor that frequently occurs in mufflers in cold environments when not in operation.

From the foregoing discussion and description, it is evident that my discoveries have provided a highly effective muffler that uniquely combines high strength, chemical and thermal resistance with simple and inexpensive construction. While the invention has been described with respect to certain detailed embodiments, it will be evident that changes can be made without departing from its scope. For example, the advantages of the invention can be achieved where both the inlet and outlet of the muffler are located on the same or adjacent sides of the casing. In this connection and by way of illustration, it is to be noted that such arrangements can be achieved by eliminating honeycomb 104 in the embodiment of FIGS. 8, 9 and 10, extending baffle member 101 to contact honeycomb 103 and locating outlet conduit 96 in the inlet end wall 95 adjacent the inlet conduit 94. Or the outlet conduit 96 of the embodiment of FIG. 9 simply could be moved to the wall adjacent wall 97 and remain downstream of honeycomb 104, thereby having the inlet and outlet conduits on adjacent walls. Similarly, outlet conduit 81 of the embodiment shown in FIGS. 6 and 7 could be moved to the bottom wall adjacent wall 80 to provide those conduits on adjacent walls. Such embodiments can be easily made without loss of efficiency, yet they provide significant design flexibility. It is also of note that a muffler of the present invention can readily be included as part of, or closely adjacent to, an exhaust manifold structure since the ceramic can withstand higher temperatures than will be encountered at locations close to the combustion chambers.

In accordance with the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A muffler for deadening the sound of gases from an internal combustion engine comprising a casing, an inlet conduit to the casing, an outlet conduit from the casing, and gas flow resistive means in the casing member intermediate the inlet and outlet conduits and consisting of at least one thin walled ceramic honeycomb having a pair of opposed surfaces and a plurality of unobstructed gas passages extending between those surfaces, the gas passages being defined by ceramic walls up to 0.015 inch thick, the cross-sectional area of each gas passage being up to 0.010 square inch and the total free cross-sectional area of the honeycomb measured in a plane perpendicular to the axes of the gas passages being at least 50 percent of the total cross-sectional area.

2. A muffler in accordance with claim 1, the inlet and outlet conduits being at opposing ends of the casing.

3. A muffler in accordance with claim 1 in which the honeycomb is located with its gas passages generally parallel to the axes of the inlet and outlet conduits.

4. A muffler in accordance with claim 1 in which a honeycomb is arranged diagonally across the casing member as viewed from the side, and the inlet conduit opens into the chamber at a point above the lower edge of one of the surfaces of the honeycomb and the outlet conduit opens into the casing chamber at a point below the uppermost edge of the other major opposed surface of the honeycomb.

5. A muffler in accordance with claim 1, said gas flow resistive means comprising at least two honeycombs arranged to a form of an inverted V as viewed from the side.

6. A muffler for an internal combustion engine comprising a casing, an inlet conduit to one end of the casing offset upwardly from the central plane of the casing and an outlet conduit from the other end of the casing offset from that central plane opposite to the direction of offset of the inlet conduit, a first baffle member extending from the inlet end wall near the inlet conduit inwardly toward but not touching the outlet end wall, a second baffle member extending inwardly into the casing from the outlet end wall near the outlet conduit toward but not touching the inlet end wall, a first thin walled ceramic honeycomb extending between a lateral wall and the first baffle member, a second thin walled ceramic honeycomb extending between the two baffle members, and a third thin walled ceramic honeycomb extending between a lateral wall and the second baffle member, each of the honeycombs having a plurality of gas passages extending between opposed surfaces, the honeycombs constituting gas flow resistive means, the cross-sectional area of each gas passage in the honeycombs being less than 0.010 square inch and the total cross-sectional area of the free space, measured in a plane perpendicular to the gas passages, being at least 50 percent of the total cross-sectional area of the honeycomb in that plane.

7. A muffler for deadening the sound of gases from an internal combustion engine comprising a casing, an inlet conduit to one end of the casing and an outlet conduit from the opposite end of the casing, a composite wall across the casing intermediate the inlet and outlet conduits, the wall comprising a gas impervious central section surrounded by honeycomb having gas passages generally parallel to the axes of the inlet and outlet conduits, additional honeycomb extending between the inlet wall of the casing and the composite wall at about the edge of the gas impervious central section, additional honeycomb having gas passages with axes in planes parallel to the inlet wall, the gas passages in the honeycombs being defined by ceramic walls up to 0.015 inch thick, the cross-sectional area of each gas passage being up to 0.010 square inch, and the total free cross-sectional area of each honeycomb in a plane perpendicular to the axes of the gas passages being at least 50 percent of the total cross-sectional area.

References Cited in the file of this patent

UNITED STATES PATENTS

| | | |
|---|---|---|
| 1,465,904 | Herdle | Aug. 21, 1923 |
| 1,891,170 | Nose | Dec. 13, 1932 |
| 1,897,649 | Good | Feb. 14, 1933 |
| 1,909,511 | Wilson | May 16, 1933 |
| 2,072,961 | Nelson | May 9, 1936 |
| 2,576,610 | Kunzog | Nov. 27, 1951 |
| 2,748,883 | Ralph | June 5, 1956 |
| 2,977,265 | Forsberg et al. | Mar. 28, 1961 |
| 3,018,841 | Gerlich | Jan. 30, 1962 |
| 3,075,609 | Potter | Jan. 29, 1963 |

OTHER REFERENCES

Publication, "Steel," pp. 126–218, August 10, 1959.